(12) United States Patent
Srinivasan et al.

(10) Patent No.: US 11,145,174 B2
(45) Date of Patent: Oct. 12, 2021

(54) METHODS AND SYSTEM FOR MONITORING AN ENVIRONMENT

(71) Applicant: SMART HOME SENTRY, INC., Sunnyvale, CA (US)

(72) Inventors: Seshadri Srinivasan, Fremont, CA (US); Uday Kiran Chaka, Mountain View, CA (US); James Garner, Vallejo, CA (US); Ramesh Sastry, Los Gatos, CA (US); Ritesh Agarwal, Foster City, CA (US)

(73) Assignee: SMART HOME SENTRY, INC., Sunnyvale, CA (US)

(*) Notice: Subject to any disclaimer, the term of this patent is extended or adjusted under 35 U.S.C. 154(b) by 0 days.

(21) Appl. No.: 16/817,616

(22) Filed: Mar. 13, 2020

(65) Prior Publication Data
US 2020/0294373 A1 Sep. 17, 2020

Related U.S. Application Data

(60) Provisional application No. 62/818,102, filed on Mar. 13, 2019.

(51) Int. Cl.
| | | |
|---|---|---|
| G08B 21/00 | (2006.01) | |
| G08B 13/08 | (2006.01) | |
| G08B 13/18 | (2006.01) | |
| H04N 21/41 | (2011.01) | |
| G08B 15/00 | (2006.01) | |

(52) U.S. Cl.
CPC .......... *G08B 13/08* (2013.01); *G08B 13/18* (2013.01); *G08B 15/002* (2013.01); *H04N 21/4131* (2013.01)

(58) Field of Classification Search
CPC ...... G08B 13/08; G08B 13/18; G08B 15/002; H04N 21/4131
USPC ...................................................... 340/540
See application file for complete search history.

(56) References Cited

U.S. PATENT DOCUMENTS

2018/0137734 A1* 5/2018 Srinivasan ......... G08B 21/0492

* cited by examiner

Primary Examiner — Tanmay K Shah
(74) Attorney, Agent, or Firm — Ashok Tankha

(57) ABSTRACT

A method and a target monitoring system (TMS) to generate descriptive parameters of one or more target objects in a region are provided. The TMS dynamically receives first data comprising image data and/or audio data of the target objects in the region and second data comprising circumstantial information related to the first data from one or more sensors positioned in one or more spatial directions in the region over a network. The TMS filters the dynamically received first data and identifies the target objects in the region using image data extracted from the filtered data. The TMS generates descriptive parameters associated with each identified target object in the region using the filtered first data and the circumstantial information.

12 Claims, 7 Drawing Sheets

METHODS AND SYSTEM FOR MONITORING AN ENVIRONMENT

CROSS-REFERENCE TO RELATED APPLICATIONS

This application claims priority to and the benefit of the provisional patent application titled "Methods And System For Monitoring An Environment", application No. 62/818,102, filed in the United States Patent and Trademark Office on Mar. 13, 2019. The specification of the above referenced patent application is incorporated herein by reference in its entirety.

BACKGROUND

The prevalence of burglary in urban homes and commercial offices is high. Current home security and commercial security systems typically generate alerts when motion is detected by a security system. However, human intervention is needed prior to alerting police in order to reduce false alarms. This step increases response time and typically is not reliable to differentiate an intruder from the owner. The increase in the response time does not avoid or prevent intrusions. Furthermore, the excessive number of false alarms generated by existing systems is annoying and costly to a user and the police.

Conventional home-security monitoring systems generally use infrared security cameras with video surveillance and motion detection methods to identify human targets. Some sophisticated home-security monitoring systems use thermal imagery using Forward-Looking Infrared (FLIR) cameras to differentiate humans from other targets. Most of these systems employ conventional motion detection methods that involve background subtraction techniques, to detect humans. Typically, upon detection of a moving object, a trigger, an alarm, a picture, a video and/or some indicator of a human presence is transmitted to the user.

Conventional home-security monitoring systems, based on motion detection, are sensitive to ambient light variations, shadows, reflections, local light variations, etc. These systems typically cause many false alarms where the motion is not caused by the target of interest, for example, motion by non-intruder, a pet, a moving vehicle, etc. The typical accuracy of these home-security monitoring systems is less than about 80% and therefore these systems are not ideal for automated surveillance and monitoring. Furthermore, these systems are sensitive to the motion of the surveillance camera and are not suitable for aerial surveillance where the camera is on a moving platform, for example, a drone, an airplane, a vehicle-mounted camera, etc.

To create a robust, automated surveillance and monitoring system, there is a need to improve the accuracy of target detection. Cameras reacting to motion often generate hundreds of alerts in a day when only a few alerts need to be generated, for example, when a person is present. Furthermore, a fully automated monitoring system and method should work in a stationary as well as moving environments, and in a wide range of ambient light settings, and be able to differentiate known targets from unknown targets.

Hence, there is a long felt but unresolved need for a method and a system for generating descriptive parameters of one or more target objects in a region so that fully automated surveillance and monitoring can be implemented, while mitigating false alarms.

SUMMARY OF THE INVENTION

This summary is provided to introduce a selection of concepts in a simplified form that are further disclosed in the detailed description of the invention. This summary is not intended to determine the scope of the claimed subject matter.

The method and the target monitoring system (TMS) operably coupled to multiple sensors of different types disclosed herein addresses the above-mentioned need for generating descriptive parameters of one or more target objects in a region. The method and the TMS identify a target such as a human or vehicle in a stationary or moving platform and differentiate known targets from unknown targets. Furthermore, the TMS provides a mechanism for subsequent use of video and audio information for home-security, surveillance, authentication, crime-avoidance, and for identifying and utilizing user-patterns.

The sensors comprise one or more image sensors, for example cameras, and one or more audio sensors, for example microphones. The field of view of each camera spans from a narrow angle, for example, about 5 degrees to a full 360-degree view depending on the application. The cameras are positioned in one or more spatial directions to obtain the spatial and temporal location information of a human, a pet, or a vehicle with high accuracy and reliability. The target monitoring system (TMS) uses signal and image processing algorithms to identify humans, pets or vehicles, the posture of the humans, and to differentiate humans and vehicles from other stationary objects in static images or video data obtained from the sensors.

The target monitoring system (TMS) dynamically receives first data comprising image data and/or audio data of the target objects in the region and second data comprising circumstantial information related to the first data from one or more sensors positioned in one or more spatial directions in the region over a network. The TMS filters the dynamically received first data of the target objects and identifies the target objects in the region using image data extracted from the filtered first data. The TMS generates descriptive parameters associated with each of the identified target objects in the region using the filtered first data and/or the second data.

In an embodiment, the target monitoring system (TMS) utilizes deep learning methods to identify a human, a pet or a vehicle. The TMS isolates target objects from individual image frames and tracks the identified targets over time to differentiate stationary from moving targets. The TMS then determines the positions of the identified target objects in the region, and tracks the determined positions of the identified target objects as a function of time to generate position-time values. The TMS determines speed and acceleration of motion of each of the identified target objects extracted from the filtered first data and/or the second data using the generated position-time values. The TMS determines colors, shapes and orientations of body parts of each of the identified target objects using image regions corresponding to each of the identified target objects. The TMS determines the action and posture of each of the identified target objects using one or more of the determined speed of motion of each of the identified target objects, the determined acceleration of each of the identified target objects, and change in the determined positions of the identified target objects, the determined colors, shapes and orientations of the body parts of each of the identified target objects. In another embodiment, the TMS utilizes audio sensors to identify a known target, for example, a human, a vehicle, or a pet.

In one or more embodiments, related systems comprise circuitry and/or programming for effecting the methods disclosed herein; the circuitry and/or programming can be any combination of hardware, software, and/or firmware configured to affect the methods disclosed herein depending upon the design choices of a system designer. Also, various structural elements can be employed depending on the design choice of a system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Disclosed herein is a method and a target monitoring system (TMS) for generating descriptive parameters of one or more target objects in a region. The method disclosed herein employs the TMS comprising at least one processor configured to execute computer program instructions for generating the descriptive parameters of the target objects in the region. As used herein, "descriptive parameters" refer to elements related to structure, shape, color, movements, and actions, for example, position, acceleration, speed of movement, posture, etc., of a body part of the target object. Also, as used herein, "target objects" refers to entities, for example, humans, pets, vehicles, etc. that are monitored by the TMS. Also, as used herein, the term "region" refers to a two-dimensional space or a three-dimensional space occupied by one or more target objects where the TMS operates to detect the target objects. A region is, for example, an area, a volume, or a portion of a room, a living area, an outdoor area, part of an aerial view obtained from a drone, part of a view obtained from a moving vehicle, etc., that can be occupied by target objects. In an embodiment, the TMS is implemented on an external computing device that is operably coupled to multiple sensors via a network, for example, a wired network or a wireless network. In another embodiment, the TMS is implemented within each of the sensors for processing data received from the sensors and for monitoring of one or more target objects in a region. In another embodiment, the TMS is implemented on a remote server that communicates with the sensors remotely via a network, for example, the internet.

Figure 1A:
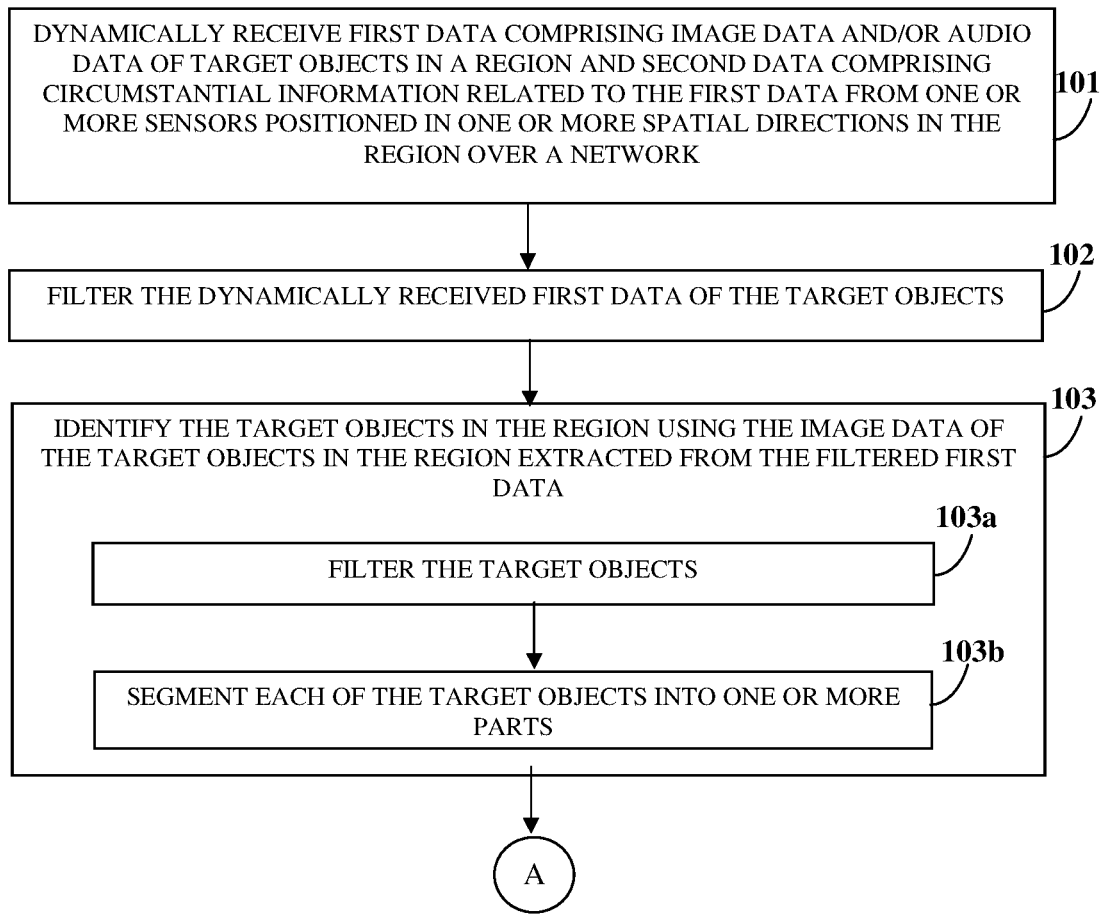
FIGS. 1A-1B illustrate a method for generating descriptive parameters of one or more target objects in a region.
Figure 1B:
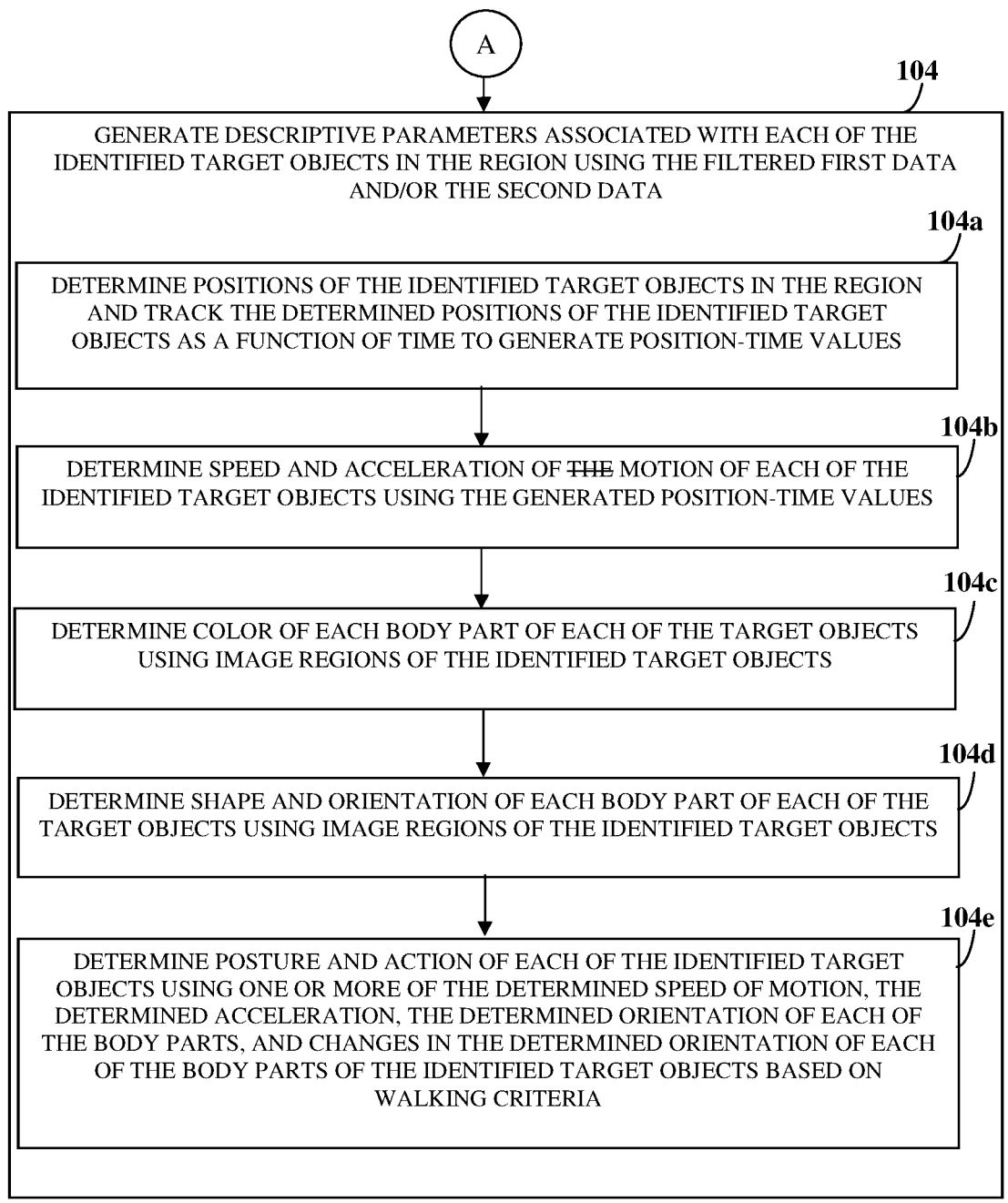

FIGS. 1A-1B illustrates a method for generating descriptive parameters of one or more target objects in a region. The target monitoring system (TMS) dynamically receives 101 first data comprising, for example, image data and/or audio data of the target objects in the region and second data comprising circumstantial information related to the first data from one or more sensors, for example, cameras, microphones, etc., positioned in one or more different spatial directions in the region over a network, for example, a wired network or a wireless network. As used herein, "data" refers to information that is generated, stored, or transmitted in a digital format by a processor capable of executing computer program instructions to process the information. In an embodiment, video cameras are used in conjunction with other devices, for example, radio frequency identification (RFID) tags, position sensing devices, motion sensors, etc., for detecting one or more target objects in the region and for generating output data. The first data captured by the sensors comprises, for example, static pictures, video, audio or any combination thereof. When the first data represents, for example, images of the region, the second data from the camera used to obtain the first data comprises, for example, color values, intensity values, voltage values corresponding to a visible or infrared spectrum, time of image capture, etc., or any combination thereof. The TMS receives the first data and the second data continually to account for a dynamic nature of situations in the region. In an embodiment, the TMS determines motion information from the camera. The image data comprises, for example, multiple images obtained at different time instants of an area or a volume.

The target monitoring system (TMS) stores the dynamically received first data of the target objects and the second data in one or more databases. In an embodiment, the TMS processes the dynamically received first data and the second data in real time without storing the dynamically received first data and the second data. The TMS receives the first data and the second data during real time imaging, for example, obtaining data when a human moves in a region of interest. In an embodiment, the TMS receives the first data and the second data from a memory unit. For example, the TMS receives the first data and the second data from a database of images, or after a motion has occurred, or from a data transfer from an external communication device. The TMS receives the first data and the second data, for example, by requesting for the first data and the second data from an external communication device, loading the first data and the second data from a memory unit, receiving the first data and the second data from the sensors, recording the first data and the second data, etc. The TMS formats the first data and the second data for display on a display unit in a compatible format, for example, a polar coordinate format, an acquisition format, etc. The TMS obtains a time history of the first data at regular intervals as part of the second data. In an embodiment, the first and the second data is stored in a local storage memory device and also communicated periodically, for example, in five minute intervals, to a global memory device in a cloud computing environment. As used herein, "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. On the occurrence of a catastrophic event, the time history of the data for a five or ten minute interval prior to and after the occurrence of the event is stored in a local memory or communicated to the cloud, that is, the cloud computing environment, and stored in a server. The TMS employs fault tolerant mechanisms locally to provide data integrity.

The target monitoring system (TMS) filters 102 the dynamically received first data of the target objects using digital signal and image processing techniques. The digital signal and image processing techniques comprise, for example, spatial filtering using a spatial filter and temporal filtering using a temporal filter. The spatial filter comprises, for example, a spatial smoothing filter, a threshold based on intensity or a color value, frequency domain filter, etc. The temporal filter comprises, for example, a temporal smoothing filter, a threshold based on intensity or a color value, a frequency domain filter, etc. In an embodiment, the TMS filters the dynamically received first data of the target objects by spatially filtering the first data using a spatial filter. The TMS performs spatial smoothing, error handling, etc., and rejects bad data in the first data. Furthermore, the TMS enhances data of the sensors using data from another set of sensors. In an embodiment, the TMS performs morphological image processing on the dynamically received first data of the target objects using a morphological image processing unit in operable communication with the spatial filter. The morphological image processing unit implements a morphological image processing function comprising, for example, region dilation, erosion, and skeletonization. The spatial smoothing filter is, for example, a median filter, a moving average filter, or a Gaussian filter. In an embodiment, the spatial filter utilizes frequency domain filtering and spatial domain processing methods.

In another embodiment, the target monitoring system (TMS) filters the dynamically received first data of the target objects by temporally filtering using the temporal filter. In an embodiment, the TMS performs morphological image processing on the dynamically received first data of the target objects using the morphological image processing unit in operable communication with the temporal filter. The TMS utilizes the temporal filter for temporal smoothing and for performing persistence and thresholding functions. The temporal smoothing filter comprises, for example, a median filter, a moving average filter, or a Gaussian filter. In an embodiment, the temporal filter utilizes frequency domain filtering methods. The TMS performs temporal smoothing, error handling, etc., and rejects bad data. Furthermore, the TMS enhances data of one of the cameras or the microphones in the sensors using data from another of the cameras or microphones.

The target monitoring system (TMS) identifies 103 one or more target objects comprising moving objects and stationary objects in the region using one or more images of the target objects in the region extracted from the filtered first data using a deep learning network or one or more motion tracking methods. As used herein, "deep learning network" refers to a neural network that incorporates residual convolutional network, a fully connected feed forward network, and a probabilistic classifier. The TMS estimates the shape characteristics of the region and then performs regional processing to identify the target objects in the region. In an embodiment, the TMS applies stereoscopic methods to obtain three-dimensional (3D) representation of the targets.

In identifying or determining the target objects, the target monitoring system (TMS) further filters 103a the filtered first data to remove static objects that resemble the target objects. The filters can use a combination of spatial and temporal methods and can be based on linear and non-linear methods. In a preferred embodiment, the temporal filters involve comparison of the target locations, target sizes, target silhouettes, and target hues with prior frames to remove static objects. Moreover, the TMS segments 103b data of one or more target objects in the region, the first data, into data of one or more body parts using one or more image segmentation techniques. As used herein, "image segmentation techniques" refers to conventional color segmentation methods such as k-means clustering, color coding, or regional area-based segmentation or edge-based segmentation. In an embodiment, the TMS applies volumetric segmentation methods to obtain three-dimensional (3D) visual imagery of body parts of the targets.

The target monitoring system (TMS) generates 104 descriptive parameters associated with each of the identified target objects in the region using one or more of the filtered first data and the second data. Also, the TMS uses the segmented data of the target objects for generating the descriptive parameters. In an embodiment, the TMS uses the generated descriptive parameters for emergency alerting and/or monitoring. The descriptive parameters comprise, for example, positions of the identified target objects in the region, speed and acceleration of each of the identified target objects, color, shape and orientation of each of multiple body parts of the identified targets, and posture of each of the identified target objects. In an embodiment, the TMS generates multiple descriptive parameters associated with each of the identified target objects in the region as follows:

The target monitoring system (TMS) determines 104a positions of the identified target objects in the region and tracks the determined position of the identified target objects as a function of time to generate position-time values. In an embodiment, the TMS determines the positions of each of the identified target objects by thresholding the motion data. The TMS identifies multiple points in the identified target objects. The TMS identifies individual target objects based on a predetermined probability threshold of the target objects.

The target monitoring system (TMS) determines 104b speed of motion and acceleration of motion of each of the identified target objects extracted from the filtered first data and/or the second data, using the generated position-time values. The determined speed of motion of each of the identified target objects is a time gradient of determined positions of each of the identified target objects. As used herein, "time gradient" of a parameter refers to a variation of the parameter with time. In an embodiment, the TMS determines the time gradient using temporal smoothing before and after gradient estimation. In another embodiment, the TMS determines the time gradient by computing speed as a slope estimation over time. In an embodiment, the TMS determines the speed of motion of each of the identified target objects using curve-fitting of the generated position-time values. The TMS determines walking speed of each of the identified target objects using the determined speed of motion of each of the identified target objects based on walking criteria. The walking criteria comprises, for example, a running condition, a normal walking condition, an intent-based walking condition, etc. The TMS generates velocity-time values from the speed determined at different points in time. The TMS determines the acceleration of each of the identified target objects extracted from the filtered first data and the second data, using the generated position-time values or the determined speed of motion of each of the identified target objects. The determined acceleration is a time gradient of the determined speed of motion of each of the identified target objects. In an embodiment, the TMS determines the time gradient using temporal smoothing before and after gradient estimation. In another embodiment, the TMS determines the time gradient by computing speed as a slope estimation over time. In an embodiment, the TMS determines the acceleration of the target objects using a second differential of the position of the target objects with respect to time. In another embodiment, the TMS determines the acceleration of the target objects using curve fitting of velocity-time values or position-time values.

The target monitoring system (TMS) determines 104c the color of each of the body parts of the identified target objects through hue analysis of image regions representing the body parts of the target object. The TMS determines the color of each of the identified target segments of each of the target objects extracted from the segmented first data using hue, saturation, value (HSV) representation of images captured from the region. The TMS generates the HSV representation of the images from the filtered and segmented first data and the second data. In an embodiment, the color for each segment is computed as a statistical parameter such as a median, or a mean, or a mode of hues within the segment.

The target monitoring system (TMS) determines 104d the shape and orientation of each of the identified target segments of each of the target objects extracted from the segmented first data, using the generated hue, saturation, value (HSV) representation of the images captured from the region. In an embodiment, the TMS uses morphological image processing to compute the major and minor axis of a segment, and subsequently computes shape as the ellipticity, and orientation as the angle of the major-axis of the segment with respect to a predetermined reference.

The target monitoring system (TMS) then determines 104e posture and action of each of the identified target objects using the determined speed of motion of each of the identified target objects, the determined acceleration of motion of each of the identified target objects, the determined orientation of each of the body parts, that is, the segments, of the target objects, and changes in the determined orientation of each of the segments of the target objects, based on the walking criteria. The TMS determines action of the motion such as exercise, slow walk, opening doors or cabinets, picking objects, sitting in a chair, lying on a bed, etc. The TMS removes outliers, for example, by differentiating between walking and running, differentiating normal walking from intent-based walking as performed during an exercise by the target objects, etc. The TMS performs spatial analysis of the determined positions of each of the identified target objects to determine the posture of each of the identified target objects by comparing determined positions of each of the identified target objects with a template of posture patterns stored in one or more databases. The spatial analysis comprises, for example, spatial filtering, spectral analysis of the determined positions of each of the identified target objects, etc.

The target monitoring system (TMS) determines an adverse event such as a fall, a theft, an accident, etc., involving one or more of the identified target objects from the generated descriptive parameters by comparing a pattern of the event with predetermined template patterns of events stored in one or more databases. The TMS records time and location information concerning the adverse event. The TMS also records the speed and acceleration associated with the adverse event, colors, shapes, and orientations of each of the body parts of each of the identified target objects involved in the adverse event, actions and postures of each of the identified target objects in the adverse event, and a pattern of the adverse event in one or more databases. The TMS generates and transmits alerts to indicate an occurrence of the adverse event such as a fall, to predict an occurrence of the adverse event, to relay information about a health status, etc., from the determined posture, the determined action, and other generated descriptive parameters to respondents, for example, a caretaker, a health assistant, a nursing facility, devices, etc., via the network. The TMS alerts a respondent via an audio, for example, an alarm, etc., or a visual mode, for example, text message, etc.

In an embodiment, the target monitoring system (TMS) determines the posture and the action of each of the identified target objects by performing a time analysis of the position of the target objects. In another embodiment, the TMS determines the posture and the action by comparing a pattern of a position-time graph derived from the generated position-time values with predetermined template patterns of position-time graphs stored in databases.

In an embodiment, the target monitoring system (TMS) assesses the health status of each of the identified target objects in communication with a template repository using the generated descriptive parameters comprising walking speed and posture associated with each of the identified target objects in the region. In an embodiment, the TMS performs a time analysis by comparing the posture, the action, and the walking speed with a predetermined template repository and alerts the respondents via a network. As used herein, the "template repository" refers to a repository with data of speed, acceleration, colors, shapes, orientation, action, posture, known patterns of medical conditions, and normal patterns of known target objects in the identified target objects in the region. The template repository also holds other data of medical conditions, for example, symptoms of diseases, for example, Alzheimer's, dementia, etc. The TMS utilizes standard methods, for example, differencing with thresholds, goodness of fit methods, etc., for comparing the posture, the action, and the walking speed with the predetermined template patterns. The time analysis comprises rejecting outliers using statistical methods, for example, mean, standard deviation, median, goodness of fit, and mode. The outliers are due to bad data and an intent-based motion, for example, exercise, etc. The time analysis further comprises computing central tendencies over a period of time, for example, days, weeks, months, and years, etc., where central tendencies comprise a mean, standard deviation, median, mode, correlation, etc.

The generation of descriptive parameters comprising, position, speed, acceleration, color, shape, orientation, posture, action etc., in the method disclosed herein is adaptive and comprises filtering, thresholding, or combinations thereof as a function of a first motion and/or position information for a first location at a first time; adapting the filtering, thresholding, or combinations thereof as a function of a second motion and/or position information for a spatially, temporally, or spatially and temporally adjacent location, time, or location and time, respectively; and determining the posture as a function of data output from the adapted filtering, thresholding or combinations thereof.

Figure 2:
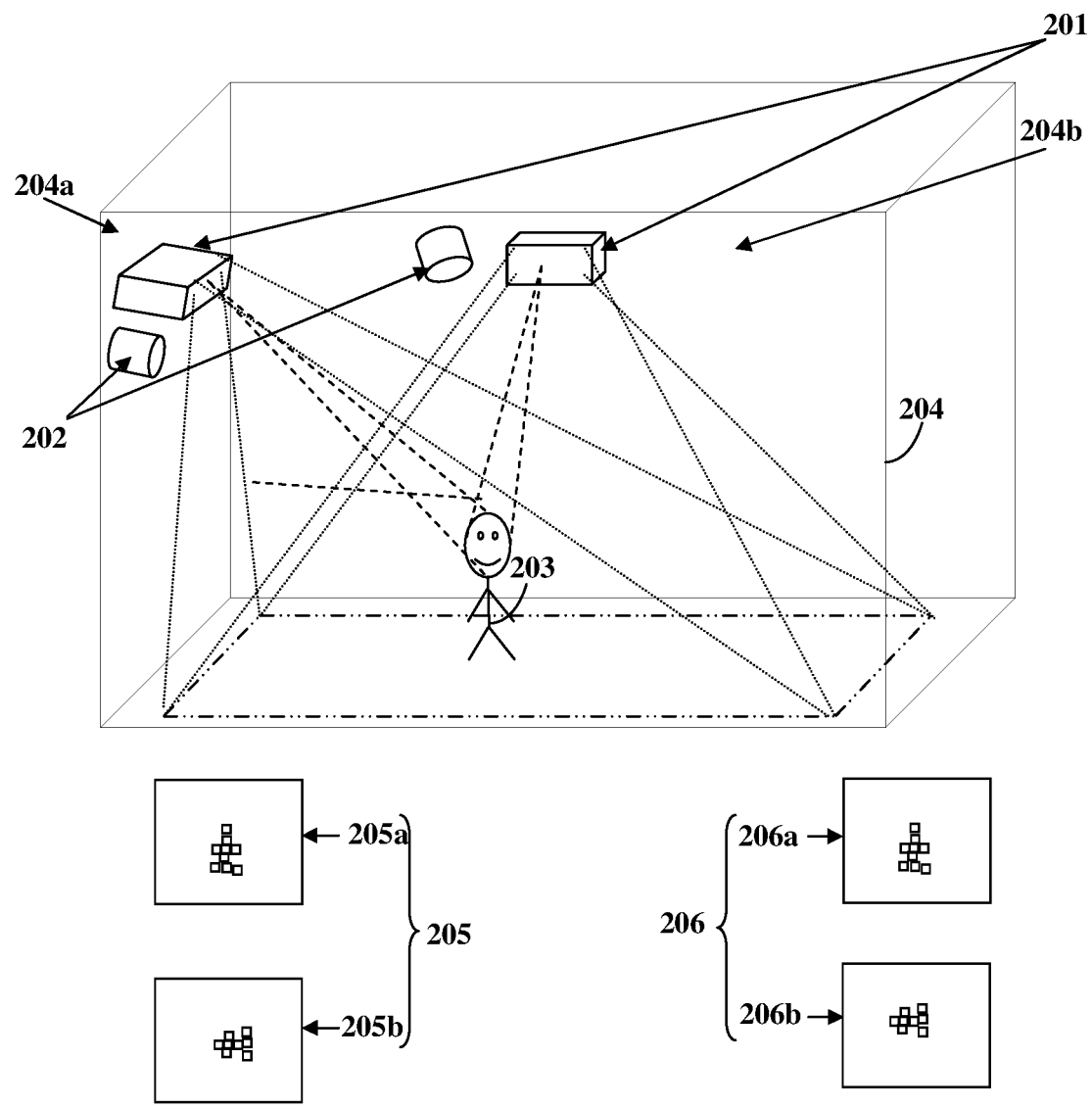
FIG. 2 exemplarily illustrates positioning of sensors in two spatial directions in a region for obtaining data of different types related to a target object.

FIG. 2 exemplarily illustrates positioning of sensors comprising arrays of cameras and/or microphones in two spatial directions in a region 204 for obtaining data of different types related to a target object 203. Two cameras 201 and/or microphones 202 are positioned in different spatial directions as exemplarily illustrated. The cameras 201 on two walls 204a and 204b of the region 204 positioned in transverse spatial directions monitor the region 204 and capture image data 205 comprising static pictures and/or video data 205a and 205b of the target object from their respective transverse directions. The field of view of each camera spans from a narrow angle, for example, about 5-degrees to a full 360-degree view. The microphones 202 on the transverse walls 204a and 204b of the region 204 positioned in transverse spatial directions monitor the region 204 and capture audio data 206 comprising directional audio data 206a and 206b of the target object from their respective transverse directions. The cameras 201 and microphones 202 transmit the captured image data 205 and the captured audio data 206 to the target monitoring system (TMS) for processing, transformation, and generation of the descriptive parameters of the target object 203 in the region 204.

Figure 3:
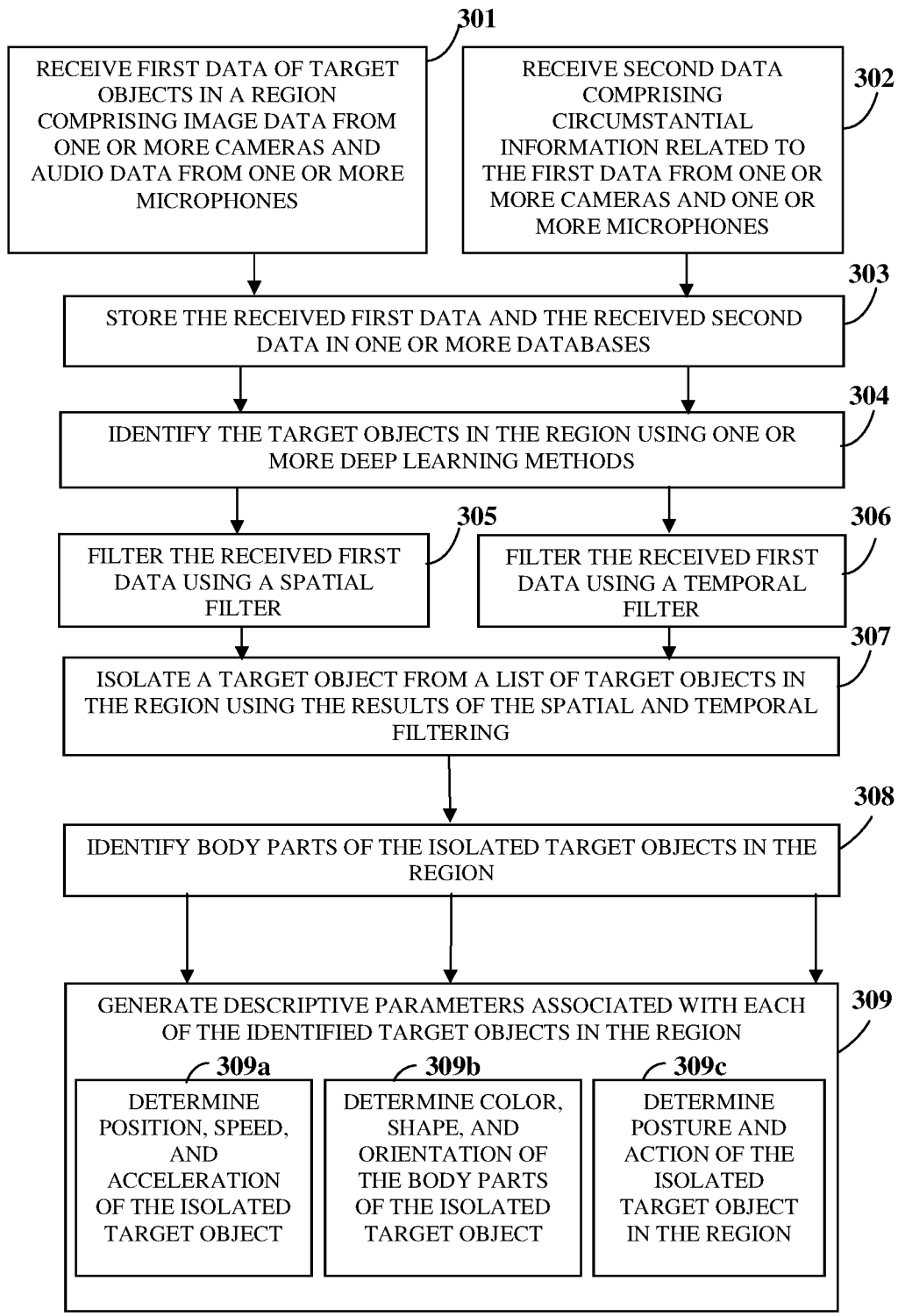
FIG. 3 exemplarily illustrates a flow diagram comprising steps performed by a target monitoring system for generating descriptive parameters of a target object in a region.

FIG. 3 exemplarily illustrates a flow diagram comprising steps performed by the target monitoring system (TMS) for generating descriptive parameters of a target object in a region. The TMS receives 301 first data of target objects in a region comprising image data received from one or more cameras 201 and audio data received from one or more microphones 202. The TMS also receives 302 second data comprising circumstantial information related to the first data from the one or more cameras 201 and the one or more microphones 202. The TMS stores 303 the received first data and the received second data in a memory unit, for example, in one or more databases. The TMS identifies 304 the target objects using one or more deep learning methods. The TMS filters 305 the received first data using a spatial filter and also filters 306 the received first data using a temporal filter. The TMS isolates 307 a target object from a list of target objects in the region using data from the spatial and temporal filters, that is, using the results from the spatial and temporal filtering. The TMS identifies 308 body parts of the isolated target object in the region. The TMS generates 309 descriptive parameters of a target object in a region by the following steps: determining 309a position, speed of motion, and acceleration of motion of the isolated target object in the region, determining 309b color, shape, and orientation of the body parts of the isolated target object in the region using the determined positions of the target object in the region, and determining 309c a posture and an action of the isolated target object in the region using the determined positions, speed, acceleration, color, shape, and orientation of the isolated target object in the region.

Figure 4:
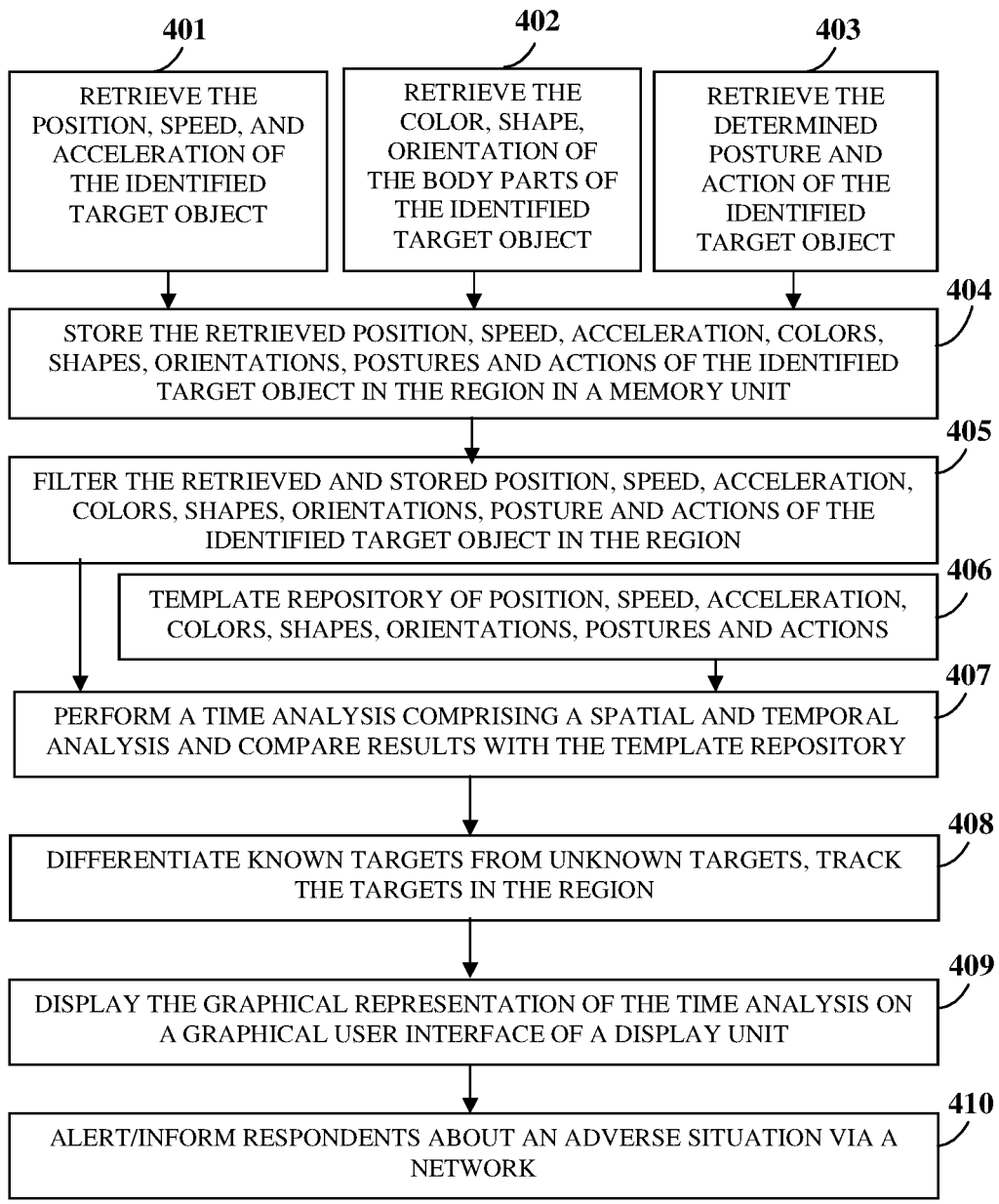
FIG. 4 exemplarily illustrates a flow diagram comprising steps performed by a target monitoring system for differentiating known target objects from unknown target objects in a region and tracking a target objects in the region.

FIG. 4 exemplarily illustrates a flow diagram comprising steps performed by the target monitoring system (TMS) for differentiating known target objects from unknown target objects in a region and tracking the target objects in the region. The TMS retrieves 401 the position, speed and acceleration of the identified target object determined by the TMS in the region. The TMS retrieves 402 the colors, shapes and orientations of the body parts of the identified target object in the region. The TMS retrieves 403 the determined posture and action of the identified target object in the region. The TMS stores 404 the retrieved position, speed, acceleration, colors of the body parts, shapes of the body parts, orientations of the body parts, postures, and actions of the identified target object in the region in a memory unit. The TMS filters 405 the stored position, speed, acceleration, colors of the body parts, shapes of the body parts, orientations of the body parts, posture, and action of the identified target object in the region. The TMS performs 407 a time analysis, comprising spatial and temporal analysis, of the filtered position, speed, acceleration, colors of the body parts, shapes of the body parts, orientations of the body parts, posture, and action of the identified target object in the region and compares the results of the time analysis with a template repository 406. The template repository stores data of speed, acceleration, colors, shapes, orientation, action, posture, and known patterns of medical conditions, for example, symptoms of diseases, for example, Alzheimer's, dementia, etc., and normal patterns of known members in the region. The TMS differentiates 408 the known targets from the unknown targets and tracks the targets in the region based on the time analysis. The TMS displays 409 the graphical representation of the time analysis on a graphical user interface of a display unit. The TMS alerts and/or informs 410 respondents about an adverse situation or event such as a fall, a break-in, an accident, etc., via a network.

Figure 5:
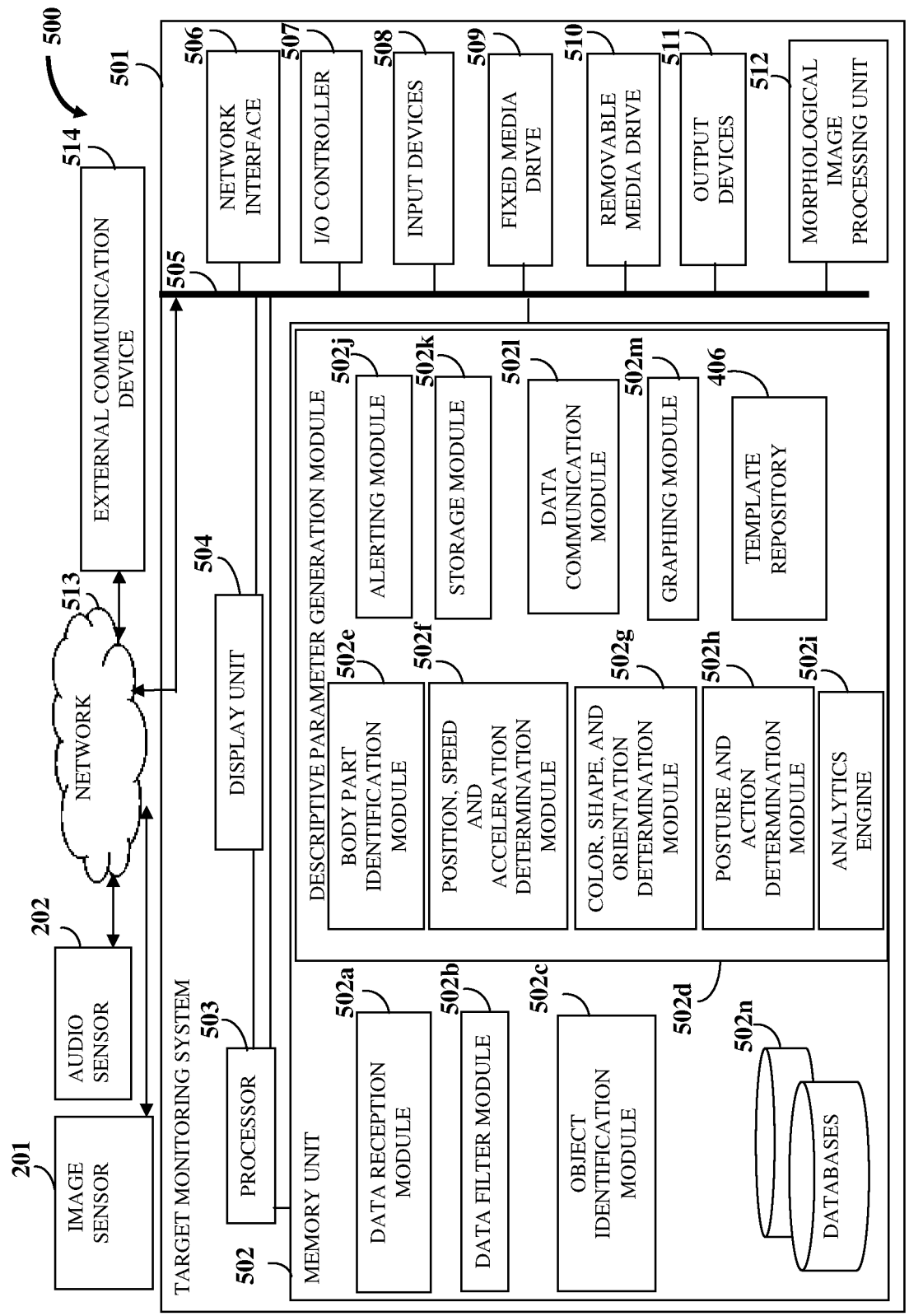
FIG. 5 exemplarily illustrates a system for generating descriptive parameters of one or more target objects in a region.

FIG. 5 exemplarily illustrates a system 500 for generating descriptive parameters of one or more target objects in a region. The system 500 disclosed herein comprises the target monitoring system (TMS) 501 operably coupled to sensors, for example, image sensors 201 and audio sensors 202, via a network 513; the image sensors 201 and audio sensors 202 are disclosed in the detailed description of FIG. 2. In the system 500 disclosed herein, the image sensors 201 and the audio sensors 202 are positioned in different spatial directions in a region. The image sensors 201 detect image data of the target objects in the region. The audio sensors 202 detect audio data of the target objects in the region comprising time-amplitude data in the audio-frequency range. The image sensors 201 comprise one or more cameras and the audio sensors 202 comprise one or more microphones. The TMS 501 is implemented on an electronic device 201, for example, a personal computer, a tablet computing device, a mobile computer, a portable computing device, a laptop, a touch device, a workstation, a server, portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc., with one or more servers associated with one or more online services. In an embodiment, the sensors, for example, the image sensors 201 obtain static pictures or video data without processing and transmit the obtained data to the TMS 501 via a network 513 for processing. In another embodiment, the TMS 501 processes data from the sensors, for example, red green blue (RGB) color model data, etc., with a spatial filter or a temporal filter. In another embodiment, the sensors are positioned in different planes to cover a large region and obtain spatial data and temporal data of the target objects with high accuracy and reliability.

The network 513 is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. The network 513 can be a wired, a wireless, or a combination of networks using different protocols. In an embodiment, the TMS 501 is accessible to respondents, for example, through a broad spectrum of technologies and devices such as cellular phones, tablet computing devices, etc., with access to the Internet.

As exemplarily illustrated, the system 500 comprises a non-transitory computer readable storage medium, for example, a memory unit 502 for storing programs and data, and at least one processor 503 communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. Non-volatile media comprise, for example, solid state drives, optical discs or magnetic disks, and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. The non-transitory computer readable storage medium stores computer program instructions defined by modules, for example, 502a, 502b, 502c, 502d, 502e, 502f, 502g, 502h, 502i, 502j, 502k, 502l, 502m, etc., of the target monitoring system (TMS) 501. The TMS 501 is installed and stored in the memory unit 502 of the system 500. The memory unit 502 is used for storing program instructions, applications, and data. The memory unit 502 is, for example, a random access memory (RAM) or another type of dynamic storage device that stores information and instructions for execution by the processor 503. The memory unit 502 also stores temporary variables and other intermediate information used during execution of the instructions by the processor 503. The TMS 501 further comprises a read only memory (ROM) or another type of static storage device that stores static information and instructions for the processor 503.

The target monitoring system (TMS) 501 comprises a data reception module 502a, a data filter module 502b, an object identification module 502c, a descriptive parameter generation module 502d, a body part identification module 502e, a position, speed, and acceleration determination module 502f, a color, shape and orientation determination module 502g, a posture and action determination module 502h, an analytics engine 502i, an alerting module 502j, a storage module 502k, a data communication module 502l, a graphing module 502m, one or more databases 502n, and a template repository 406 stored in the memory unit 502. The template repository 406 is as disclosed in the detailed description of FIG. 4. The databases 502n of the TMS 501 can be any storage area or medium that can be used for storing data and files. In an embodiment, the databases 502n can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the databases 502n can also be a location on a file system. In another embodiment, the databases 502n can be remotely accessed by the TMS 501 via the network 513. In another embodiment, the databases 502n are configured as cloud-based databases implemented in a cloud computing environment, where computing resources are delivered as a service over a network, for example, the internet. As used herein, "cloud computing environment" refers to a processing environment comprising configurable computing physical and logical resources, for example, networks, servers, storage, applications, services, etc., and data distributed over the network 513. The cloud computing environment provides on-demand network access to a shared pool of the configurable computing physical and logical resources. In an embodiment, the TMS 501 system is a cloud computing based platform implemented as a service for generating descriptive parameters of one or more target objects in a region. The TMS 501 is developed, for example, using the Google App engine cloud infrastructure of Google Inc, Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

The processor 503 executes the computer program instructions defined by the target monitoring system (TMS) 501. The processor 503 refers to any microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 503 is implemented as a processor set comprising, for example, a programmed microprocessor and a math or graphics co-processor. The processor 503 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The TMS 501 disclosed herein is not limited to employing a processor 503. In an embodiment, the TMS 501 employs a controller or a microcontroller. The processor 503 executes the modules, for example, 502a, 502b, 502c, 502d, 502e, 502f, 502g, 502h, 502i, 502j, 502k, 502l, 502m, etc., of the TMS 501.

As exemplarily illustrated, the system 500 further comprises a data bus 505, a network interface 506, an input/output (I/O) controller 507, input devices 508, a fixed media drive 509 such as a hard drive, a removable media drive 510 for receiving removable media, and output devices 511. The network interface 506 enables connection of the TMS 501 in the system 500 to the network 513. In an embodiment, the network interface 506 is provided as an interface card also referred to as a line card. The network interface 506 comprises, for example, of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 507 controls input actions and output actions performed by the TMS 501.

The data reception module 502a dynamically receives first data comprising the image data and/or the audio data of the target objects in the region and second data comprising circumstantial information related to the first data from the sensors comprising the image sensors 201 and the audio sensors 202 over the network 513. The data filter module 502b filters the dynamically received first data of the target objects by spatially filtering the dynamically received first data of the target objects using a spatial filter or temporally filtering the dynamically received first data of the target objects using a temporal filter. In an embodiment, the target monitoring system 501 further comprises a morphological image processing unit 512 operably coupled to the spatial filter or the temporal filter and performs morphological image processing on the dynamically received first data of the target objects. The object identification module 502c identifies the target objects in the region using image data of the target objects in the region extracted from the filtered first data using a deep learning network or one or more motion tracking methods. In a preferred embodiment, the object identification module 502c identifies the target objects using a deep learning network that incorporates residual convolutional network, a fully connected feed forward network, and a probabilistic classifier.

The descriptive parameter generation module 502d generates descriptive parameters associated with each of the identified target objects in the region using the filtered first data and/or the received second data. In an embodiment, the generated descriptive parameters are used for emergency alerting, monitoring, and/or health assessment. In an embodiment, the descriptive parameter generation module 502d comprises a body part identification module 502e, position, speed, and acceleration determination module 502f, a color, shape, and orientation determination module 502g, and a posture and action determination module 502h. The position, speed, and acceleration determination module 502e determines positions of the identified target objects in the region and tracks the determined positions of the identified target objects as a function of time to generate position-time values. The position, speed, and acceleration determination module 502e determines speed of motion of each of the identified target objects using the generated position-time values to yield velocity-time values. In an embodiment, the position, speed, and acceleration determination module 502e determines the speed of motion of each of the identified target objects by curve-fitting the generated position-time values. The position, speed, and acceleration determination module 502e determines acceleration of each of the identified target objects using one of the generated position-time values and the determined speed of motion of each of the identified target objects. In an embodiment, the position, speed, and acceleration determination module 502e determines acceleration of each of the identified target objects by curve-fitting of one of the velocity-time values and the position-time values. The position, speed, and acceleration determination module 502e determines walking speed of each of the identified target objects using the determined speed of motion of each of the identified target objects based on walking criteria comprising, for example, a falling condition, a running condition, a normal walking condition, an intent-based walking condition, etc. The posture and action determination module 502h determines the posture and action of each of the identified target objects using the determined speed of motion of each of the identified target objects, the determined acceleration of each of the identified target objects, the determined orientation of each of the body parts of the identified target objects, and the change in relative orientation of each of the body parts of the identified target objects based on the walking criteria. In an embodiment, the posture and action determination module 502h records time of occurrence of each activity of each of the identified target objects, location of occurrence of each activity, and other parameters of each activity such as speed, acceleration, colors, orientations and shapes of the body parts of each of the identified target objects. In another embodiment, the posture and action determination module 502h further determines an adverse event such as a fall, a theft, or an accident of each of the identified target objects by comparing a pattern of the determined posture or action with predetermined template patterns of postures and actions stored in one or more databases 502n.

The storage module 502k stores the dynamically received first data and the second data of the target objects in one or more databases 502n. The analytics engine 502i assesses the health of each of the identified target objects in communication with a template repository 406, as disclosed in the detailed description of FIG. 4, using the determined position, speed, acceleration, colors, shapes, orientation, and the determined action and posture. The analytics engine 502i further determines an adverse event such as a fall, a theft, an accident, etc. of each of the identified target objects by performing a time analysis of one of the generated descriptive parameters followed by comparing a pattern of the determined posture or action with predetermined template patterns of postures and actions. The analytics engine 502i further performs a time analysis of the determined posture data and action data. The alerting module 502j generates and transmits alerts to indicate an occurrence of a fall, a health status, a risk of a fall, etc., from the generated descriptive parameters to respondents via the network 513. The data communication module 502l communicates with an external communication device 514 over the network 513 to receive input from the external communication device 514 and transmit output data to the external communication device 514. The graphing module 502m generates graphs from the position-time values and the velocity-time values, and graphs of the generated descriptive parameters.

The display unit 504, via a graphical user interface (GUI), displays outputs of the time analysis. The display unit 504 comprises, for example, a video display, a liquid crystal display, a plasma display, an organic light emitting diode (OLED) based display, etc. The input devices 508 are used for inputting data into the TMS 501. A user uses the input devices 508 to provide inputs to the TMS 501. For example, the user can access the health status, adverse event data, activity patterns etc., by clicking the GUI using the input devices 508. The input devices 508 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the target monitoring system (TMS) 501. The programs are loaded onto the fixed media drive 509 and into the memory unit 502 of the system 500 via the removable media drive 510. In an embodiment, the computer applications and programs may be loaded directly on the system 500 via the network 513. The output devices 511 output the results of operations performed by the TMS 501. For example, the TMS 501 renders the health status, activity pattern data, time analysis data, etc., using the output devices 511.

The processor 503 executes an operating system, for example, Linux® operating system, Unix® operating system, any version of Microsoft® Windows® operating system, Mac OS of Apple Inc., IBM® OS/2, VxWorks® of Wind River Systems, Inc., QNX Neutrino® developed by QNX Software Systems Ltd., Palm OS®, Solaris operating system developed by Sun Microsystems, Inc., Android® operating system of Google Inc., Windows Phone® operating system of Microsoft Corporation, BlackBerry® operating system of BlackBerry Limited, iOS operating system of Apple Inc., Symbian™ operating system of Symbian Foundation Limited, etc. The target monitoring system (TMS) 501 employs the operating system for performing multiple tasks. The operating system is responsible for management and coordination of activities and sharing of resources of the TMS 501. The operating system further manages security of the TMS 501, peripheral devices connected to the TMS 501, and network connections. The operating system employed on the TMS 501 recognizes, for example, inputs provided by the user of the system 500 using one of the input devices 508, the output devices 511, files, and directories stored locally on the fixed media drive 509. The operating system on the TMS 501 executes different programs using the processor 503. The processor 503 and the operating system together define a computer platform for which application programs in high level programming languages are written. The operating system of the system 500 determines the programming languages used in the TMS 501. For example, Java® programming language is used for developing the TMS 501 on the system 500 with the Android® operating system, while Objective-C® of Apple Inc., is used for developing the TMS 501 on the system 500 with the iOS operating system, and the UNITY® libraries and platforms of Unity IPR ApS, LLC., are used for developing the TMS 501 for both the Android® operating system and the iOS operating system.

The processor 503 retrieves instructions defined by the data reception module 502a, the data filter module 502b, the object identification module 502c, the body part identification module 502e, the position, speed and acceleration determination module 502f, the color, shape and orientation determination module 502g, the posture and action determination module 502h, the analytics engine 502i, the alerting module 502j, the storage module 502k, the data communication module 502l, the graphing module 502m stored in the memory unit 502, for performing respective functions disclosed above. The processor 503 retrieves instructions for executing the modules, for example, 502a, 502b, 502c, 502d, 502e, 502f, 502g, 502h, 502i, 502j, 502k, 502l, 502m, etc., of the target monitoring system (TMS) 501 from the memory unit 502. A program counter determines the location of the instructions in the memory unit 502. The program counter stores a number that identifies the current position in a program of each of the modules, for example, 502a, 502b, 502c, 502d, 502e, 502f, 502g, 502h, 502i, 502j, 502k, 502l, 502m, etc., of the TMS 501. The instructions fetched by the processor 503 from the memory unit 502 after being processed are decoded. The instructions are stored in an instruction register in the processor 503. After processing and decoding, the processor 503 executes the instructions, thereby performing processes defined by those instructions.

At the time of execution, the instructions stored in the instruction register are examined to determine the operations to be performed. The processor 503 then performs the specified operations. The operations comprise arithmetic operations and logic operations. The operating system performs multiple routines for performing a number of tasks required to assign the input devices 508, the output devices 511, and the memory unit 502 for execution of the modules, for example, 502a, 502b, 502c, 502d, 502e, 502f, 502g, 502h, 502i, 502j, 502k, 502l, 502m, etc., of the target monitoring system (TMS) 501. The tasks performed by the operating system comprise, for example, assigning memory to the modules, for example, 502a, 502b, 502c, 502d, 502e, 502f, 502g, 502h, 502i, 502j, 502k, 502l, 502m, etc., of the TMS 501, and to data used by the TMS 501, moving data between the memory unit 502 and disk units, and handling input/output operations. The operating system performs the tasks on request by the operations and after performing the tasks, the operating system transfers the execution control back to the processor 503. The processor 503 continues the execution to obtain outputs. The outputs of the execution of the modules, for example, 502a, 502b, 502c, 502d, 502e, 502f, 502g, 502h, 502i, 502j, 502k, 502l, 502m, etc., of the TMS 501 are displayed to the user on the output device 511.

A non-transitory computer readable storage medium stores computer program codes comprising instructions executable by at least one processor for generating descriptive parameters of one or more target objects in a region. The computer program codes comprise a first computer program code for dynamically receiving first data comprising image data and or audio data of the target objects in the region and second data from sensors 201 and 202 positioned in one or more spatial directions in the region over a network 513; a second computer program code for filtering the dynamically received first data of the target objects; a third computer program code for identifying the target objects in the region using image data of the target objects in the region extracted from the filtered first data; a fourth computer program code for generating descriptive parameters associated with each of the identified target objects in the region using the filtered first data and/or the second data.

In an embodiment, the fourth computer program code for generating descriptive parameters associated with each of the identified target objects in the region comprises: a fifth computer program code for determining positions of the identified target objects and tracking the determined positions of the identified target objects as a function of time to generate position-time values based on walking criteria, the walking criteria comprising a falling condition, a running condition, a normal walking condition, an intent-based walking condition, etc.; a sixth computer program code for determining speed of motion of each of the identified one or more target objects using the generated position-time values; a seventh computer program code for determining acceleration of each of the identified target objects using one of the generated position-time values and the determined speed of motion of each of the identified target objects; an eighth computer program code for determining color, shape, and orientation of body parts of each of the identified target objects using image regions of the identified target objects; a ninth computer program code for determining action and posture of each of the identified target objects using one or more of the determined speed of motion, the determined acceleration, the determined color of the body parts, the determined shape of the body parts, and the determined orientation of the body parts of each of the identified target objects; a tenth computer program code for determining an adverse event from the generated descriptive parameters by comparing a pattern of the event with predetermined template patterns of events stored in one or more databases; an eleventh computer program code for recording a time of occurrence and a location of occurrence of the adverse event, a speed and an acceleration associated with the adverse event, colors, shapes, orientations of body parts of the identified target objects, etc., involved in the adverse event, actions and postures of the identified target objects in the adverse event, and the pattern of the adverse event in one or more databases; and a twelfth computer program code for generating and transmitting alerts configured to indicate an occurrence of the adverse event, to predict an occurrence of the adverse event, and to relay a periodic status from the generated descriptive parameters to one or more respondents via the network 513.

The non-transitory computer readable storage medium disclosed herein further stores additional computer program codes for performing additional steps that may be required and contemplated for generating descriptive parameters of one or more target objects in a region. In an embodiment, a single piece of computer program code comprising computer executable instructions performs steps of the method disclosed herein for generating descriptive parameters of one or more target objects in a region. The computer program codes comprising computer executable instructions are embodied on the non-transitory computer readable storage medium. The processor 503 of the target monitoring system 501 retrieves these computer executable instructions and executes them. When the computer executable instructions are executed by the processor 503, the computer executable instructions cause the processor 503 to perform the steps of the method for generating descriptive parameters of the target objects in a region.

Figure 6:
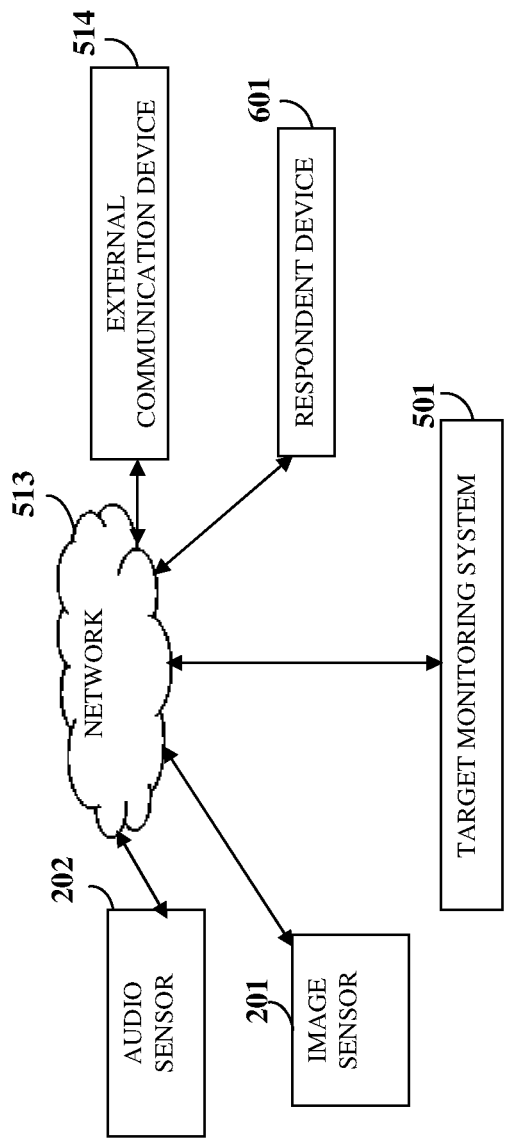
FIG. 6 exemplarily illustrates communication between multiple components of the system for generating descriptive parameters of one or more target objects in a region.

FIG. 6 exemplarily illustrates communication between multiple components of the system 500 for generating descriptive parameters of one or more target objects in a region. The target monitoring system (TMS) 501 of the system 500 disclosed in the detailed description of FIG. 5 communicates with the image sensors 201 and the audio sensors 202 disclosed in the detailed description of FIG. 2, the external communication device 514 disclosed in the detailed description of FIG. 5, and a respondent device 601 via the network 513. The respondent device 601 is an electronic device, for example, a personal computer, a tablet computing device, a mobile computer, a mobile phone, a smart phone, a portable computing device, a laptop, a personal digital assistant, a wearable device such as the Google Glass™ of Google Inc., the Apple Watch® of Apple Inc., etc., a touch centric device, a workstation, a server, a client device, a portable electronic device, a network enabled computing device, an interactive network enabled communication device, a web browser, any other suitable computing equipment, combinations of multiple pieces of computing equipment, etc. The TMS 501 transmits an alert to the respondent device 601 via the network 513 to notify the respondent device 601 with information regarding the adverse event. In an embodiment, the TMS 501 communicates with the external communication device 514 to obtain sensor data stored therein via the network 513 for generating descriptive parameters of one or more target objects in a region and notifying the respondent device 601. A generic computer using a generic program cannot interface instantaneously with the sensors located in the region of interest where the descriptive parameters, for example, a fall, walking speed, and position of the target objects are to be determined and monitored.

In the system 500 disclosed herein, the target monitoring system (TMS) 501 interfaces with the sensors 201 and 202, the external communication device 514, and a respondent's device 601 for generating descriptive parameters of one or more target objects in a region, and therefore uses more than one computing system. The data, for example, images, audio, etc., of the target objects received from the sensors 201 and 202, for example, cameras, microphones, etc., via the network 513 are processed and executed by an algorithm in the TMS 501 for storing, determining and monitoring the activity, the speed, the position data and assessing health of the target objects. The TMS 501 uses signal and image processing algorithms to identify humans, pets or vehicles, the posture of the humans, and to differentiate humans and vehicles from other stationary objects in static images or video data obtained from the sensors. In an embodiment, the TMS 501 uses traditional morphological image processing algorithms, for example, skeletonization, and segmentation, and other pattern recognition methods, for example, template matching with known shapes that match the desired objects such as humans or pets or vehicles in different postures. In an embodiment, the TMS 501 also uses one or more of deep learning and machine learning methods that are specifically tuned to identifying certain shapes that resemble the desired objects. In case of audio data, the TMS 501 uses combinations of the frequency, amplitude, pitch, or a time-distribution of the frequency spectrum to identify the desired objects. The TMS 501 implements specific computer programs to determine the fall, the walking speed, the position, and assessing health of the target objects. The TMS 501 collects the data from the sensors and transforms the collected data from the sensors 201 and 202 to eliminate bad data and enhance the accuracy. Further, the TMS 501 processes the transformed data to determine the walking speed, the position, colors, shapes, and orientations, and assess health of the target objects, and from this information, through the use of another separate and autonomous computer program, the TMS 501 monitors the activity and the health status of the target objects.

In the method disclosed herein, the design and flow of interactions between the target monitoring system (TMS) 501 with the sensors 201 and 202 is deliberate, designed, and directed. The interactions designed by the TMS 501 allow the TMS 501 to collect information about the target objects, and from this information, through the use of another separate and autonomous computer program, the TMS 501 transforms the collected data and through the use of another separate and autonomous computer program, infers the motion, position, colors, shapes, orientations, action, and posture of the target objects. This inference is used as a trigger to determine the activities and notify the respondent device about the activities. To collect the activities, for example, walking speed, motion, position, action, and posture, etc., of the target objects and notify the respondent device about the activities requires no less than three separate computer programs, the execution of which cannot be easily or manually executed by a person working with a generic computer. A generic computer using a generic program cannot determine and monitor the fall, the walking speed, and the position of the target objects in accordance with the method steps identified above.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in several manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C #, Java®, JavaScript®, Fortran, Ruby, Perl®, Python®, Visual Basic®, hypertext preprocessor (PHP), Microsoft®.NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the system 500 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the system 500 disclosed herein are implemented as programmed elements, or non-programmed elements, or any suitable combination thereof.

Where databases are described such as the database 502n, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 500, the databases are integrated to communicate with each other for enabling simultaneous updates of data linked across the databases, when there are any updates to the data in one of the databases.

The method and the system 500 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the system 500 disclosed herein are not limited to a particular computer system platform, processor, operating system, or network. In an embodiment, one or more aspects of the method and the system 500 disclosed herein are distributed among one or more computer systems, for example, servers configured to provide one or more services to one or more client computers, or to perform a complete task in a distributed system. For example, one or more aspects of the method and the system 500 disclosed herein are performed on a client-server system that comprises components distributed among one or more server systems that perform multiple functions according to various embodiments. These components comprise, for example, executable, intermediate, or interpreted code, which communicate over a network using a communication protocol. The method and the system 500 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the system 500 disclosed herein. While the method and the system 500 have been described with reference to various embodiments, it is understood that the words, which have been used herein, are words of description and illustration, rather than words of limitation. Further, although the method and the system 500 have been described herein with reference to particular means, materials, and embodiments, the method and the system 500 are not intended to be limited to the particulars disclosed herein; rather, the method and the system 500 extend to all functionally equivalent structures, methods and uses, such as are within the scope of the appended claims. Those skilled in the art, having the benefit of the teachings of this specification, may affect numerous modifications thereto and changes may be made without departing from the scope and spirit of the method and the system 500 disclosed herein in their aspects.

We claim:

1. A method for generating descriptive parameters of one or more target objects in a region, the method employing a target monitoring system comprising at least one processor configured to execute computer program instructions for performing the method, the method comprising:

dynamically receiving first data comprising one or more of image data and audio data of the one or more target objects in the region from one or more sensors positioned in one or more spatial directions in the region, over a network, by the target monitoring system, wherein the one or more sensors comprise an image sensor and an audio sensor;

dynamically receiving second data comprising circumstantial information related to the first data, over the network by the target monitoring system, wherein when the first data comprises image data, the corresponding second data comprises one or more of color values, intensity values, voltage values corresponding to a visible or infrared spectrum and time of image capture, and wherein when the first data comprises audio data, the corresponding second data comprises one or more of frequency, amplitude, pitch, and time-distribution of frequency spectrum;

filtering the dynamically received first data of the one or more target objects, by the target monitoring system;

identifying the one or more target objects in the region, by the target monitoring system, using the filtered first data, wherein the identification is performed using a deep learning network comprising one or more of a residual convolutional network, a fully connected feed forward network, and a probabilistic classifier; and generating descriptive parameters associated with each of the identified one or more target objects in the region, by the target monitoring system, using one or more of the filtered first data and the received second data.

2. The method of claim 1, wherein the descriptive parameters comprise one or more of position, speed, and acceleration of each of the identified one or more target objects, color, shape, and orientation of each of a plurality of body parts of each of the identified one or more target objects, and action and posture of each of the identified one or more target objects.

3. The method of claim 1, wherein the generated descriptive parameters are used for one or more of emergency alerting, monitoring, and health assessment.

4. The method of claim 1, wherein the generation of the descriptive parameters associated with each of the identified one or more target objects in the region comprises:

determining position of the identified one or more target objects and tracking the determined position of the identified one or more target objects as a function of time to generate position-time values by the target monitoring system;

determining speed of motion of the identified one or more target objects using the generated position-time values by the target monitoring system based on walking criteria, the walking criteria comprising a falling condition, a running condition, a normal walking condition, and an intent-based walking condition;

determining acceleration of motion of the identified one or more target objects using one of the generated position-time values and the determined speed of motion of the identified one or more target objects by the target monitoring system based on the walking criteria;

determining color, shape, and orientation of each of a plurality of body parts of the identified one or more target objects using image regions of the identified one or more target objects by the target monitoring system; and determining posture and action of the identified one or more target objects by the target monitoring system using one or more of the determined speed of motion, the determined acceleration of motion, the determined orientation of each of the plurality of body parts, and changes in the determined orientation of each of the plurality of body parts of each of the identified one or more target objects based on the walking criteria.

5. The method of claim 1, further comprising:

determining an adverse event by monitoring each of the identified one or more target objects and comparing activity patterns of the identified one or more target objects with a template repository using the determined one or more of the generated descriptive parameters comprising a walking speed, a color, a shape, an orientation, an action, and a posture associated with each of the identified one or more target objects in the region;

recording a time of occurrence and a location of occurrence of the adverse event, a speed and an acceleration associated with the adverse event, color, shape, and orientation of each of a plurality of body parts of each of the identified one or more target objects involved in the adverse event, action and posture of each of the identified one or more target objects in the adverse event, and a pattern of the adverse event in one or more databases by the target monitoring system; and generating and transmitting alerts configured to indicate one or more of an occurrence of the adverse event, to predict an occurrence of the adverse event and to relay a periodic status from the generated descriptive parameters to one or more respondents by the target monitoring determination system via the network.

6. A system for generating descriptive parameters of one or more target objects in a region, the system comprising:

one or more sensors comprising one or more image sensors and one or more audio sensors positioned in one or more spatial directions in a region; and a target monitoring system operably coupled to the sensors, the target monitoring system comprising:

a non-transitory computer readable storage medium configured to store computer program instructions defined by modules of the target monitoring system; and at least one processor communicatively coupled to the non-transitory computer readable storage medium and operably coupled to the sensors, the at least one processor configured to execute the computer program instructions defined by the modules of the target monitoring system, the modules comprising:

a data reception module configured to dynamically receive first data comprising one or more of image data and audio data of the one or more target objects in the region from the one or more sensors positioned in the one or more spatial directions in the region, over a network;

said data reception module further configured to dynamically receive second data comprising circumstantial information related to the first data over the network, wherein when the first data comprises image data, the corresponding second data comprises one or more of color values, intensity values, voltage values corresponding to a visible or infrared spectrum and time of image capture, and wherein when the first data comprises audio data, the corresponding second data comprises one or more of frequency, amplitude, pitch, and time-distribution of frequency spectrum;

a data filter module configured to filter the dynamically received first data of the one or more target objects;

an object identification module configured to identify the one or more target objects in the region using the filtered first data, wherein the identification is performed using a deep learning network comprising one or more of a residual convolutional network, a fully connected feed forward network, and a probabilistic classifier; and a descriptive parameter generation module configured to generate descriptive parameters associated with each of the identified one or more target objects in the region using one or more of the filtered first data and the received second data.

7. The system of claim 6, wherein the descriptive parameters comprise one or more of position, speed, and acceleration of each of the identified one or more target objects, color, shape, and orientation of each of a plurality of body parts of each of the identified one or more target objects, and action and posture of each of the identified one or more target objects.

8. The system of claim 6, wherein the generated descriptive parameters are used for one or more of emergency alerting, monitoring, and health assessment.

9. The system of claim 6, wherein the descriptive parameter generation module comprises:

a body part identification module configured to determine each of a plurality of body parts of each of the identified one or more target objects in the region;

a position, speed and acceleration determination module configured to determine position, speed of motion and acceleration of motion of each of the identified one or more target objects in the region and to track the determined position, speed of motion and acceleration of motion of each of the identified one or more target objects as a function of time, based on walking criteria, the walking criteria comprising a falling condition, a running condition, a normal walking condition, and an intent-based walking condition;

a color, shape, and orientation determination module configured to determine color, shape and orientation of each of the plurality of body parts of each of the identified one or more target objects in the region;

a posture and action determination module configured to determine posture and action of each of the identified one or more target objects using one or more of the determined speed of motion, the determined acceleration of motion, the determined orientation of each of the plurality of body parts, and changes in the determined orientation of each of the plurality of body parts of each of the identified one or more target objects based on the walking criteria;

an analytics engine configured to monitor each of the identified one or more target objects and compare activity patterns of the identified one or more target objects with a template repository using the generated descriptive parameters comprising a walking speed, a color, a shape, an orientation, an action, and a posture associated with each of the identified one or more target objects in the region to determine an adverse event;

the analytics engine further configured to record a time of occurrence and a location of occurrence of the adverse event, a speed and an acceleration associated with the adverse event, color, shape, and orientation of the each of the plurality of body parts of each of the identified one or more target objects involved in the adverse event, action and posture of each of the identified one or more target objects in the adverse event, and a pattern of the adverse event in one or more databases;

an alerting module configured to generate and transmit alerts configured to indicate one or more of an occurrence of the adverse event, to predict an occurrence of the adverse event and to relay a periodic status from the generated descriptive parameters to one or more respondents via the network;

a storage module configured to store the dynamically received first data and the second data of the one or more target objects in one or more databases;

a data communication module configured to receive input from an external communication device and transmit output data to the external communication device;

a graphing module configured to generate graphs from the generated descriptive parameters; and a template repository configured to store data of speed, acceleration, color, shape, orientation, action, posture, known patterns of medical conditions, and normal patterns of known target objects in the identified one or more target objects in the region.

10. The system of claim 6, wherein the target monitoring system further comprises a morphological image processing unit operably coupled to one of a spatial filter and a temporal filter and configured to perform morphological image processing on the dynamically received first data and the second data of the one or more target objects in the region.

11. A non-transitory computer readable storage medium having embodied thereon, computer program codes comprising instructions executable by at least one processor for generating descriptive parameters of one or more target objects in a region, the computer program codes comprising:

a first computer program code for dynamically receiving first data comprising one or more of image data and audio data of the one or more target objects in the region from one or more sensors positioned in one or more spatial directions in the region, over a network, wherein the one or more sensors comprise an image sensor and an audio sensor;

a second computer program code for dynamically receiving second data comprising circumstantial information related to the first data, over a network wherein when the first data comprises image data, the corresponding second data comprises one or more of color values, intensity values, voltage values corresponding to a visible or infrared spectrum and time of image capture, and wherein when the first data comprises audio data, the corresponding second data comprises one or more of frequency, amplitude, pitch, and time-distribution of frequency spectrum;

a third computer program code for filtering the dynamically received first data of the one or more target objects;

a fourth computer program code for identifying the one or more target objects in the region using the filtered first data, wherein the identification is performed using a deep learning network comprising one or more of a residual convolutional network, a fully connected feed forward network, and a probabilistic classifier;

a fifth computer program code for generating descriptive parameters associated with each of the identified one or more target objects in the region using one or more of the filtered first data and the second data.

12. The non-transitory computer readable storage medium of claim 11, wherein the fifth computer program code further comprises:

a sixth computer program code for determining position of the identified one or more target objects and tracking the determined position of the identified one or more target objects as a function of time to generate position-time values;

a seventh computer program code for determining speed of motion of each of the identified one or more target objects using the generated position-time values based on walking criteria, the walking criteria comprising a falling condition, a running condition, a normal walking condition, and an intent-based walking condition;

an eighth computer program code for determining acceleration of motion of each of the identified one or more target objects using one of the generated position-time values and the determined speed of motion of each of the identified one or more target objects based on the walking criteria;

a ninth computer program code for determining color, shape, and orientation of each of a plurality of body parts of each of the identified one or more target objects using image regions of the identified one or more target objects;

a tenth computer program code for determining posture and action of each of the identified one or more target objects using one or more of the determined speed of motion, the determined acceleration of motion, the determined orientation of each of the plurality of body parts, and changes in the determined orientation of each of the plurality of body parts of each of the identified one or more target objects based on the walking criteria;

an eleventh computer program code for determining an adverse event monitoring each of the identified one or more target objects and comparing activity patterns of the identified one or more target objects with a template repository using the determined one or more of the generated descriptive parameters comprising a walking speed, the color, the shape, the orientation, the action, and the posture associated with each of the identified one or more target objects in the region;

a twelfth computer program code for recording a time of occurrence and a location of occurrence of the adverse event, a speed and an acceleration associated with the adverse event, color, shape, and orientation of each of a plurality of body parts of each of the identified one or more target objects involved in the adverse event, action and posture of the each of the identified one or more target objects in the adverse event, and a pattern of the adverse event in one or more databases; and a thirteenth computer program code for generating and transmitting alerts configured to indicate one or more of an occurrence of the adverse event, to predict an occurrence of the adverse event and to relay a periodic status from the generated descriptive parameters to one or more respondents via the network.

* * * * *